United States Patent
Howes et al.

(10) Patent No.: US 11,870,840 B2
(45) Date of Patent: Jan. 9, 2024

(54) DISTRIBUTED PARTITIONED MAP REDUCE USING A DATA FABRIC

(71) Applicant: Workday, Inc., Pleasanton, CA (US)

(72) Inventors: Jason Howes, Somerville, MA (US); Noah Arliss, Lexington, MA (US)

(73) Assignee: Workday, Inc., Pleasanton, CA (US)

( * ) Notice: Subject to any disclaimer, the term of this patent is extended or adjusted under 35 U.S.C. 154(b) by 956 days.

(21) Appl. No.: 15/870,407

(22) Filed: Jan. 12, 2018

(65) Prior Publication Data

US 2019/0222633 A1 Jul. 18, 2019

(51) Int. Cl.
| | |
|---|---|
| G06F 12/00 | (2006.01) |
| G06F 11/10 | (2006.01) |
| G06F 12/06 | (2006.01) |
| G06F 12/10 | (2016.01) |
| H04L 67/10 | (2022.01) |
| G06F 9/50 | (2006.01) |
| H04L 67/1001 | (2022.01) |

(52) U.S. Cl.
CPC ............ H04L 67/10 (2013.01); G06F 9/5066 (2013.01); H04L 67/1001 (2022.05)

(58) Field of Classification Search
None
See application file for complete search history.

(56) References Cited

U.S. PATENT DOCUMENTS

| | | | | |
|---|---|---|---|---|
| 6,718,361 B1 * | 4/2004 | Basani | ................ | H04L 67/1095 709/201 |
| 2008/0027920 A1 * | 1/2008 | Schipunov | .......... | G06F 16/2471 |
| 2010/0122065 A1 * | 5/2010 | Dean | ......................... | G06F 9/54 712/203 |
| 2010/0281166 A1 * | 11/2010 | Buyya | .................. | G06F 9/5072 709/226 |
| 2012/0317579 A1 * | 12/2012 | Liu | ..................... | G06F 11/1438 718/104 |
| 2013/0103729 A1 * | 4/2013 | Cooney | ............. | G06F 16/24568 707/831 |
| 2013/0103880 A1 | 4/2013 | Mehrotra | | |
| 2015/0150017 A1 * | 5/2015 | Hu | ......................... | G06F 12/00 718/103 |
| 2016/0019090 A1 * | 1/2016 | Kuromatsu | ........... | G06F 9/5038 718/102 |

(Continued)

*Primary Examiner* — Nicholas R Taylor
*Assistant Examiner* — Ho T Shiu
(74) *Attorney, Agent, or Firm* — Van Pelt, Yi & James LLP

(57) ABSTRACT

A system for a distributed partitioned map reduce includes a plurality of nodes, a plurality of partitions, and a service node. The one or more partitions of the plurality of partitions are stored on a first node of the plurality of nodes. The service node is configured to receive a task from a client application system. The client application system receives a request to perform the task from a requestor. The client application system selects a service node to manage execution of the task. The client application system provides the service node the task. The service node is configured to provide partition task logic to the plurality of partitions. The partition task logic includes a partition task map reduce. The service node is configured to receive partition results from the plurality of partitions, execute a service node reduce to determine a service node result, and provide the service node result.

17 Claims, 11 Drawing Sheets

(56) References Cited

U.S. PATENT DOCUMENTS

| | | | |
|---|---|---|---|
| 2016/0034205 A1* | 2/2016 | Mehra | G06F 3/061 |
| | | | 711/153 |
| 2016/0098472 A1* | 4/2016 | Appleton | G06F 16/27 |
| | | | 707/737 |
| 2016/0283282 A1* | 9/2016 | Hu | G06F 9/5072 |
| 2016/0321310 A1 | 11/2016 | Alshammari | |
| 2017/0255634 A1* | 9/2017 | Wang | G06F 16/3331 |
| 2019/0004894 A1* | 1/2019 | Chagam Reddy | G06F 11/1076 |

\* cited by examiner

DISTRIBUTED PARTITIONED MAP REDUCE USING A DATA FABRIC

BACKGROUND OF THE INVENTION

Cluster computing systems comprising a plurality of computing systems operating in parallel often use a MapReduce programming paradigm for processing large data sets. The MapReduce paradigm, or more generally map reduce as referred to herein, comprises a map step that is executed in parallel on subsets of a data set (e.g., equal subsets of the data), followed by a reduce step that combines the results of the map step into a single output. The reduce step is executed by the master node of the cluster system. The map step can take full advantage of the parallelism of the cluster, however, the reduce step is executed by the single master node. This creates a limitation where the master node acts as a bottleneck to future cluster computing operations.

BRIEF DESCRIPTION OF THE DRAWINGS

Various embodiments of the invention are disclosed in the following detailed description and the accompanying drawings.

DETAILED DESCRIPTION

Figure 1:
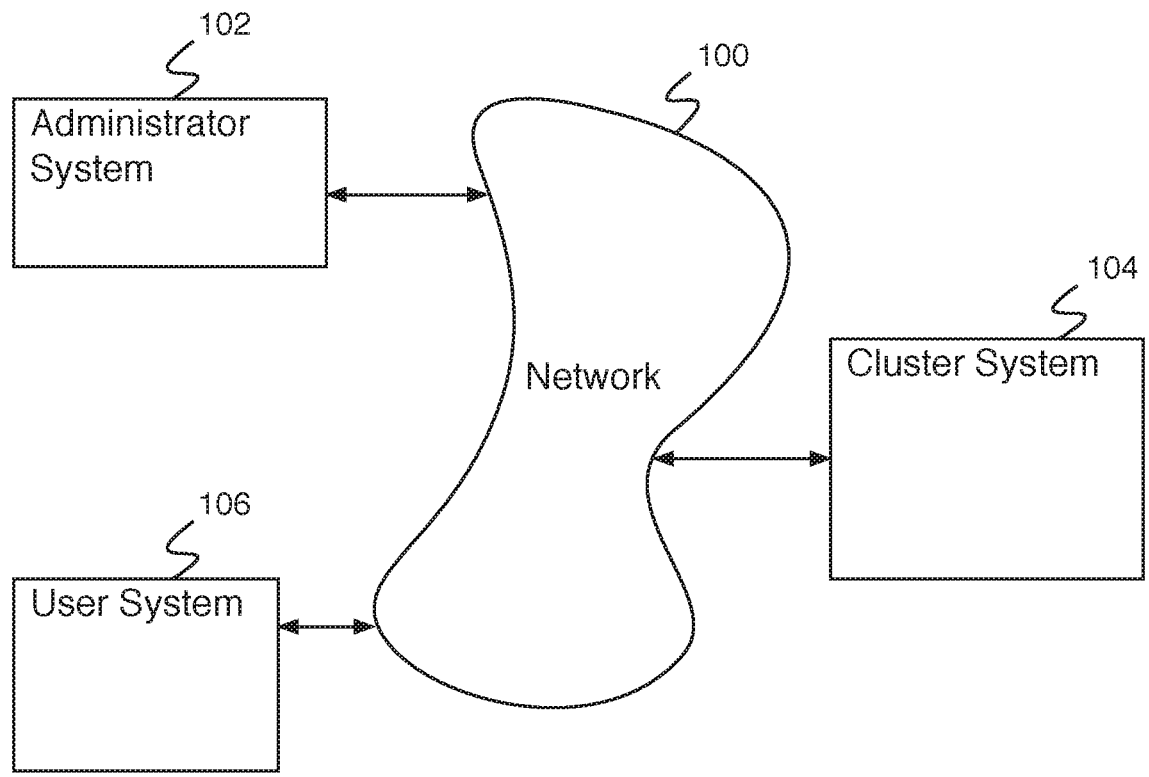
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a distributed partitioned map reduce is disclosed. The system comprises a plurality of nodes, a plurality of partitions, and a service node. One or more partitions of the plurality of partitions are stored on a first node of the plurality of nodes. The service node is configured to receive a task from a client application system, wherein the client application system receives a request to perform the task from a requestor, wherein the client application system selects a service node to manage execution of the task, and wherein the client application system provides the service node the task. The service node is configured to provide partition task logic to the plurality of partitions, wherein the partition task logic includes a partition task map reduce; receive partition results from the plurality of partitions; execute a service node reduce to determine a service node result; and provide the service node result.

A system for a distributed partitioned map reduce is disclosed. The system comprises a plurality of nodes, a plurality of partitions, and one or more services (hosted by one or more service nodes). The partitions are equally divided between the nodes of the system. The service nodes expose a well-defined interface to the system with which they can receive and process requests from a requestor. Services are computational libraries that provide a well-defined interface to the system through which the services can receive requests. Nodes contain services and the same service can be deployed to multiple nodes allowing for scalability. The requestor selects a service node to manage execution of a task and sends the request to that node by using a local representation of the interface exposed by the service running on the service node. When selecting a service node, the system can be configured to use the same node for every request or a different node for every request (e.g., to evenly distribute the load). If a service is deployed to multiple nodes, the selection of a service node is picked at random to start, subsequent requests are routed either to the same node for every request or a different node for every request. The service nodes are configured to receive a task, provide partition task logic to the plurality of partitions, wherein the partition task logic includes a partition task map and a partition task reduce, receive partition results from the plurality of partitions, receive partition results from the plurality of partitions, execute a service node reduce to determine a service node result, and provide the service node result. In some cases, the service node receives a request from the requestor, divides the request equally between the plurality of partitions, and sends the resulting sub-divided tasks to the plurality of nodes. Each node responds to the requestor with each of the results of the requests to which they were assigned, after which the service node aggregates the partitioned results into a single result and responds to the requestor with that result.

A system for a distributed partitioned map reduce comprises a cluster system comprising a plurality of computing nodes and one or more client application systems. A user system communicates with the cluster system via a client application system to request execution of a cluster computing task. The client application system chooses a computing node of the plurality of computing nodes and designates the chosen computing node as the service node for the task. The client application system chooses the computing node in such a way as to balance the load on the nodes of the cluster system. For example, the client application system chooses the least loaded node, the node that least recently acted as a service node, etc. The client application system then provides the designated service node with the task. The task comprises a partition map reduce step which is subdivided by the service node, one per partition, and a final service node reduce step.

The service node receives the task and provides each other node of the cluster system with partition task logic, comprising a partition task map and a partition task reduce. For example, the service node provides the partition nodes (e.g., nodes in the cluster that store partitions, where the partitions collectively are used for the storage of data) in the cluster with the map reduce steps in parallel (one per partition) and then aggregates the results into a single result which it responds with to the requestor. Note that service nodes can also store or not store data in partitions. A partition node receives the partition task logic and executes the partition task map step on each partition stored by the node. It should be noted that the ownership of partitions by nodes is flexible and can be rearranged by the system; a given partition may, at some time, be moved to be stored on a different node, which then assumes ownership of the moved partition. The partition task map step comprises data processing instructions that can be executed on each data element stored by a partition. The partition task reduce is then used to combine the results of executing the partition task map step on elements of data stored in the partition. A partition task reduce is used to generate a partition result associated with each partition stored on the node. The partition results are then provided by the nodes to the service node.

In some embodiments, the partition results are combined using a node reduce step. The node reduce step combines results of each partition stored on a node, generating a single node result associated with each node of the cluster. The node results are then provided by the nodes to the service node.

The service node receives results (e.g., partition results, node results) and combines the results using a service node reduce step to determine a service node result. The service node result comprises the result of the requested parallel clustered map reduce steps. The service node provides the service node result to the requesting system. The system for a distributed partitioned map reduce improves the computing system by distributing the work of the reduce step in two ways, avoiding the bottleneck effect. The system for a distributed partitioned map reduce distributes the reduce step in a first way by selecting the service node to balance the load of the reduce step. A first service node for a first task and a second service node for a second task comprise different nodes, avoiding the bottleneck. Additionally, the partition task reduce step or the node reduce step are distributed across the nodes of the cluster, leaving a minimum of work remaining for the service node to perform.

FIG. 1 is a block diagram illustrating an embodiment of a network system. In some embodiments, the network system of FIG. 1 comprises a system for a distributed partitioned map reduce using a data fabric. Cluster computing system 104 comprises a computing system for processing cluster computing jobs. Processing cluster computing jobs comprises processing software jobs utilizing a cluster computing system (e.g., a computing system utilizing a plurality of computers operating in parallel). Cluster computing system 104 comprises a node pool comprising a plurality of computing nodes, wherein each node comprises data storage and data processing capacity. The computing nodes process computing tasks (e.g., reading data, writing data, processing data, etc.). Each node stores one or more partitions, each partition comprising partition data. A plurality of partitions is stored by cluster system 104. The cluster computing system additionally comprises one or more client nodes that include a client application system that a user interacts with from user system 106. User system 106, administrator system 102, and cluster system 104 interact using network 100.

Cluster system 104 comprises a system for a distributed partitioned map reduce using a data fabric. When a cluster computing task is received by a client application system of cluster system 104 (e.g., from user system 106, administrator system 102, etc.), the client application system determines a node of a node pool and designates a service node for the task. The service node comprises a node for coordinating execution of the task and for performing a service node reduce step to determine a service node result. The client application system chooses the service node in such a way as to balance the load on the nodes. For example, the client application system chooses the least loaded node, the client application system chooses the node that was least recently chosen as a service node, the client application system chooses the service node according to a round robin ordering, etc. The client application system indicates to that node that it has been designated the service node for the task and provides the task to the service node. The service node, upon receiving the task from the client application system, begins execution and coordination of the task. The service node provides partition task logic to the plurality of partitions stored by cluster system 104 (e.g., by providing the partition task logic to the plurality of nodes each with their set of partitions). The partition task logic is executed for each partition. The partition task logic comprises a map step associated with a partition that is executed on each data element stored by the partition to create a set of values for each partition. The partition task logic additionally comprises a reduce step that is used to combine values from the map step associated with the partition to create a partition result for each partition stored locally on the node. Some systems for a distributed partitioned map reduce using a data fabric additionally combine the partition results for each partition of a node using a node reduce to generate a node result. The partition results or the node results are provided by the nodes to the service node. The service node then executes the service node reduce to combine the results received from the nodes and determine a service node result. The service node result comprises the task result. The service node provides the service node result to the client application system, which then provides the service node result to the requesting system.

User system 106 comprises a system for requesting computations to be performed using cluster system 104. In various embodiments, network 100 provides a means for communicating between administrator system 102, cluster system 104, and user system 106, and comprises one or more of the following: a local area network, a wide area network, a wired network, a wireless network, the Internet, an intranet, a storage area network, or any other appropriate communication network. Administrator system 102 enables an administrator to maintain cluster system 104. Administrator system 102 comprises a system for executing administrator commands, for configuring cluster system 104, for querying cluster system 104, etc. In some embodiments, user system 106 comprises a client system, for example an object transaction server or an object read server.

Figure 2:
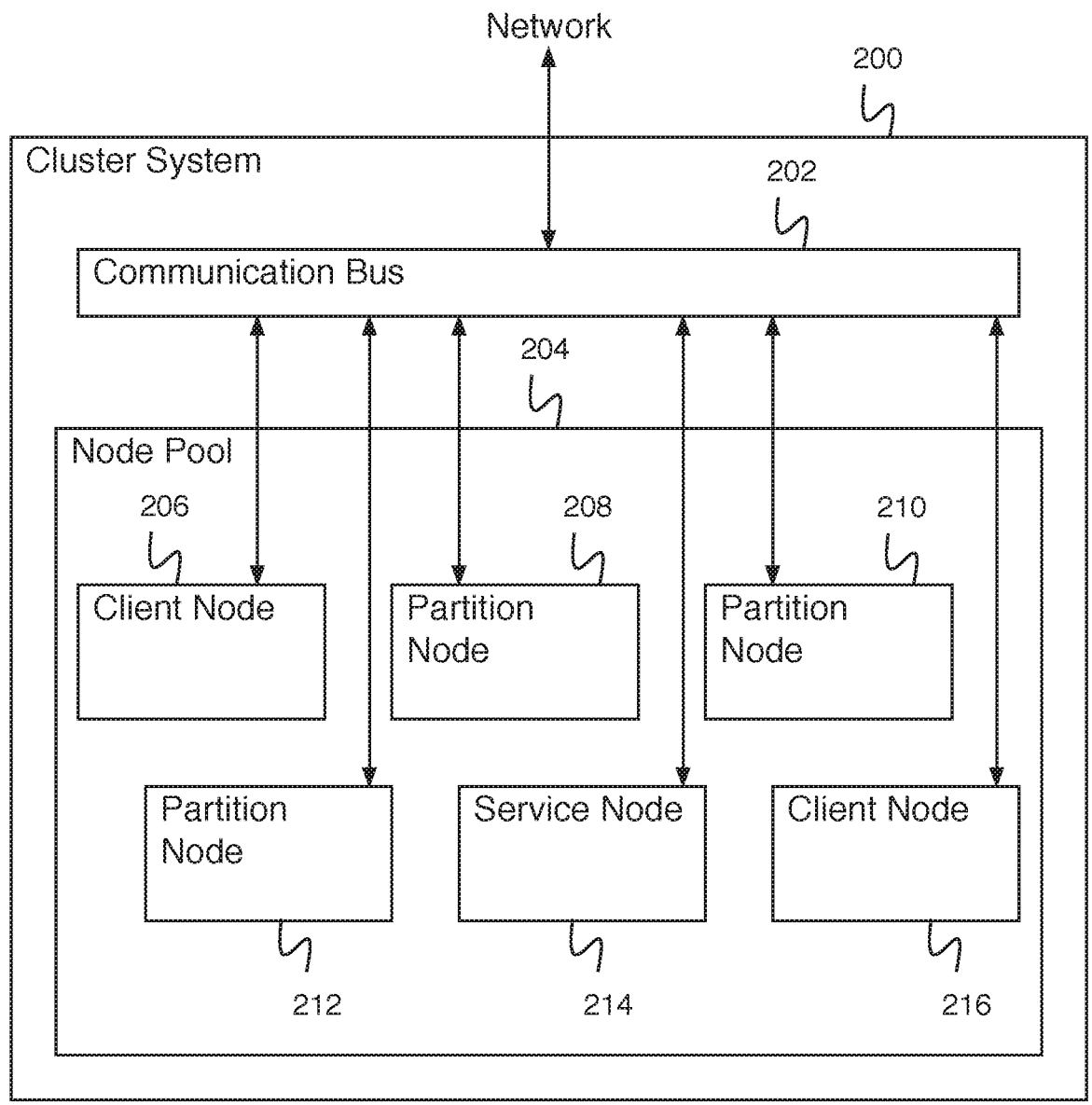
FIG. 2 is a block diagram illustrating an embodiment of a cluster system.

FIG. 2 is a block diagram illustrating an embodiment of a cluster system. In some embodiments, cluster system 200 comprises cluster system 104 of FIG. 1. In some embodiments, cluster system 200 comprises a data fabric. In the example shown, cluster system 200 comprises communication bus 202 for allowing a plurality of nodes to communicate with each other using a network. Nodes of node pool 204 include client nodes (e.g., client node 206 and client node 216), service nodes (e.g., service node 214), and partition nodes (e.g., partition node 208, partition node 210, partition node 212, etc.). Cluster system 200 comprises any appropriate number of client nodes (e.g., 1 client node, 2 client node, 5 client nodes, etc.). In some embodiments, client nodes of cluster system 200 are able to interact with any appropriate service nodes in order to balance the task processing load. Communication bus 202 also enables communication of cluster system 200 with a network enabling communication with an administrator system, user system, or other cluster system. Each of the one or more nodes comprises a computing system, for example, a computing system comprising a processor, a memory, data storage, etc. Nodes of the node pool are able to communicate with each other via communication bus 202. Nodes of the node pool can be separate computer systems, physically remote separate computer systems, separate computer systems connected via the Internet, cloud computing systems, virtual machines, virtual machines running on a single computer, etc. Node pool 204 comprises any appropriate number of nodes (e.g., 1 node, 2 nodes, 6 nodes, 12 nodes, 23 nodes, etc.). Each node stores data in a plurality of partitions. Some partitions comprise primary partitions. Some partitions comprise backup partitions—for example, copies of primary partitions, wherein a backup partition is stored on a different node than its associated primary partition. A node storing a primary partition and a node storing the associated backup partition can be physically proximate, physically remote, running as virtual machines on the same computer, or instantiated in any other appropriate way.

When cluster system 200 receives a request to perform a task, the request is initially received by communication bus 202. The requester can comprise an administrator system, a client system, a client server, an object transaction server, an object read server, etc. A client application system selects a service node—for example, a client application system associated with a user system selects a least loaded service node, a least recently chosen node, a randomly chosen node, etc.—and routes the request to the determined service node. The service node provides partition task logic to each partition node of the node pool via communication bus 202. Each node (e.g., including the service node) then executes the partition task logic. Executing the partition task logic comprises executing a map step on each partition on the node. In some embodiments, executing the task comprises executing a map step on each primary partition on the node. Executing the map step for a partition comprises executing a map operation on each data element stored by the partition to create a set of map values for the partition. Executing the partition task logic additionally comprises executing a reduce step to combine the map values to create a partition result for a partition. In some embodiments, the partition task logic additionally comprises a node reduce. A node executes the node reduce to combine the partition results for the partitions of a node to create a node result for a node. Results from each node (e.g., a set of partition results or a node result for each node) are provided to the service node via communication bus 202. The service node uses a service node reduce to combine the results from each node to determine a service node result. The service node result is provided via communication bus 202 to a client application system and provided via communication bus 202 to the user system.

Figure 3:
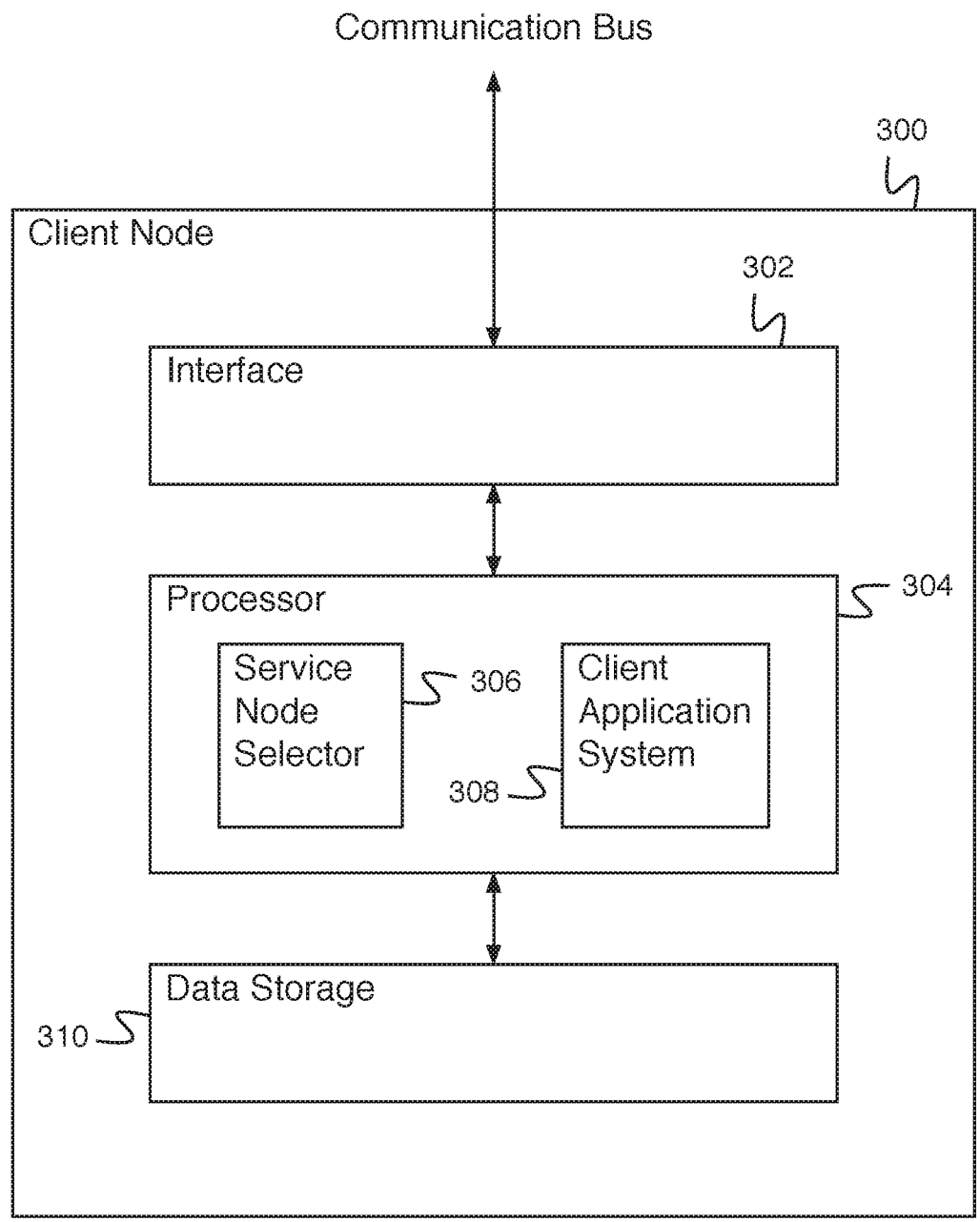
FIG. 3 is a block diagram illustrating an embodiment of a client node.

FIG. 3 is a block diagram illustrating an embodiment of a client node. In some embodiments, client node 300 comprises a client node of FIG. 2 (e.g., client node 206 or client node 216). In the example shown, client node 300 comprises interface 302 for interacting with other systems, (e.g., with a network, with a user system via the network, with a node pool, with a node of the node pool via a communication bus, etc.). Interface 302 is in communication with processor 304. Processor 304 comprises a processor for processing data. Processor 304 comprises service node selector 306 for selecting a service node (e.g., from a set of nodes of a node pool). Processor 304 includes a client application system 308 (e.g., a read system or a transaction system). Processor 304 is in communication with data storage 310 for storing data. In some embodiments, the data fabric with its partitions stores all data for the cluster system so that a local data storage (e.g., data storage 310) is not used. In some embodiments, data storage 310 comprises a temporary storage for data such as a cache or processor memory for use during processing. Service node selector 306 of processor 304 receives a request to perform a task from client application system 308. The service node selector 306 selects a service node to process a task (e.g., a least loaded node, a next node in a round robin manner, etc.), and provides the task to the selected service node. After the task is executed as managed by the service node, client node 300 receives the results and provides them to the user.

Figure 4:
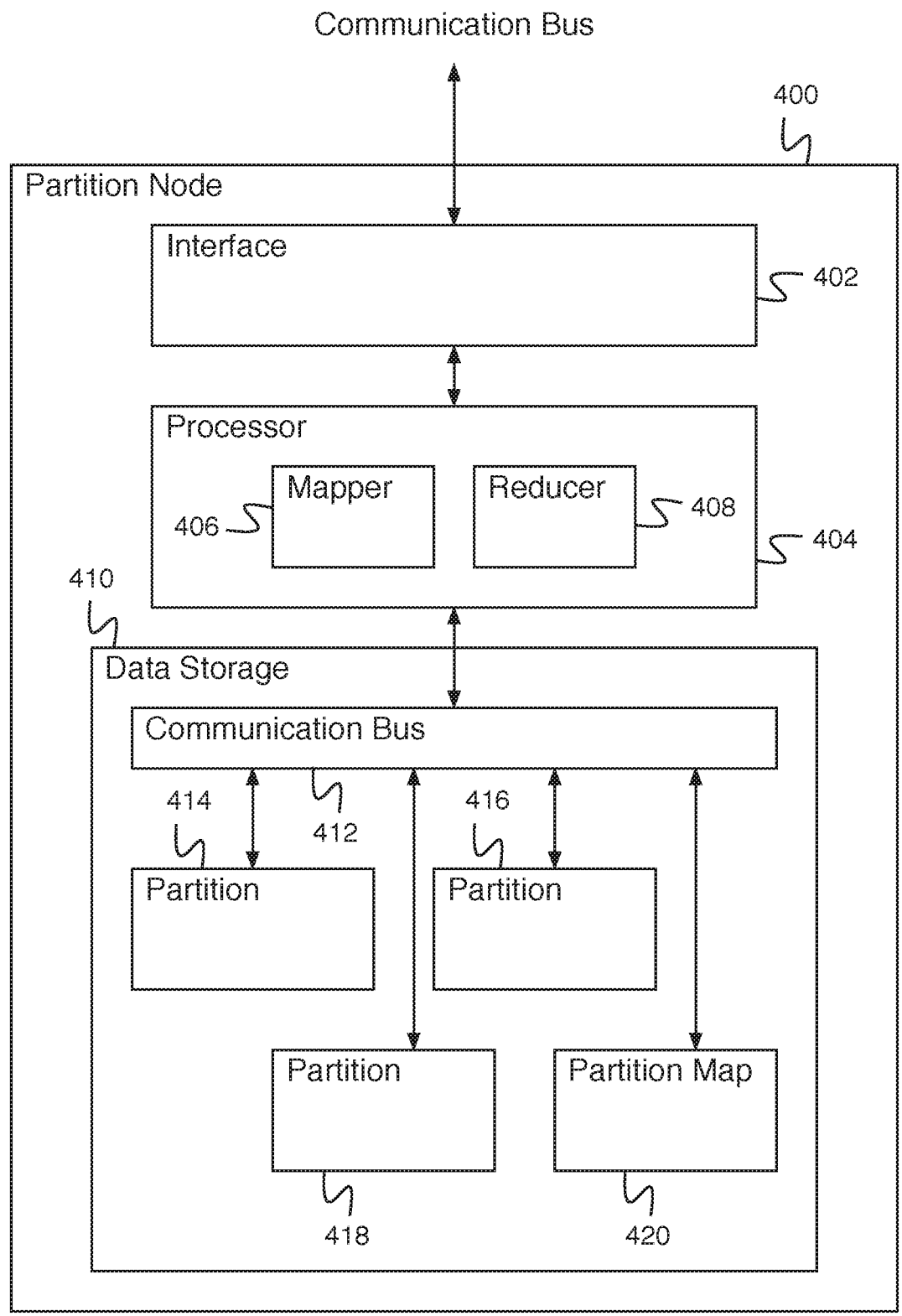
FIG. 4 is a block diagram illustrating an embodiment of a partition node.

FIG. 4 is a block diagram illustrating an embodiment of a partition node. In some embodiments, partition node 400 comprises a partition node of node pool 204 of FIG. 2 (e.g., partition node 208, partition node 210, and partition node 212). In the example shown, partition node 400 comprises interface 402 for interacting with other systems (e.g., with a client application system). Interface 402 is in communication with processor 404. Processor 404 comprises a processor for processing data. In the example shown, processor 404 comprises mapper 406 for executing a map operation. For example, mapper 406 comprises a mapper for executing a partition map operation on each data element stored by a partition (e.g., a partition stored by data storage 410) to create a set of partition map values for the partition. Processor 404 additionally comprises reducer 408 for executing a reduce operation. For example, reducer 408 executes a partition reduce step to combine partition map values to create a partition result for a partition. In some embodiments, reducer 408 executes a node reduce step to combine partition results to create a node result for a node. Partition results and/or node results are provided by processor 404 to a service node via interface 402. Processor 404 is in communication with data storage 410. Data storage 410 comprises communication bus 412 for allowing partition 414, partition 416, partition 418, or partition map 420 to communicate with processor 404. Partition 414, partition 416, and partition 418 comprise partitions for storing partition data. In some embodiments, partition 414, partition 416, and partition 418 comprise part of a data fabric. Partition map 420 comprises a partition map for storing partition metadata. Partition metadata comprises primary partition identifiers, backup partition identifiers, indications of partition lock status (e.g., read locked, write locked), etc. Partition map 420 acts as a gatekeeper for interactions with data stored on the partitions of a node and, in particular, mediates different requests for accessing the data including reading access, writing access, editing access, or deleting access and whether those requests are allowed or not allowed based on what access is currently occurring for the data.

In the example shown, for processing, partition node 400 receives partition process instructions via interface 402 for partitions that are used to execute operations for elements of each partition (e.g., partition 414, partition 416, and partition 418) of partition node 400. Mapper 406 of processor 404 distributes map instructions to each partition and results are provided to reducer 208. The results are reduced at the partition level or further reduced at the node level. The reduced results are provided to the service node. Access to the partitions is coordinated by partition map 420. For example, partition map 420 is used to negotiate access to data stored in a partition. Specifically, one example of access control by partition map 420 is when reading access is delayed to data in a given partition by partition map 420 until an existing write for that specific data in the given partition has been completed.

Figure 5:
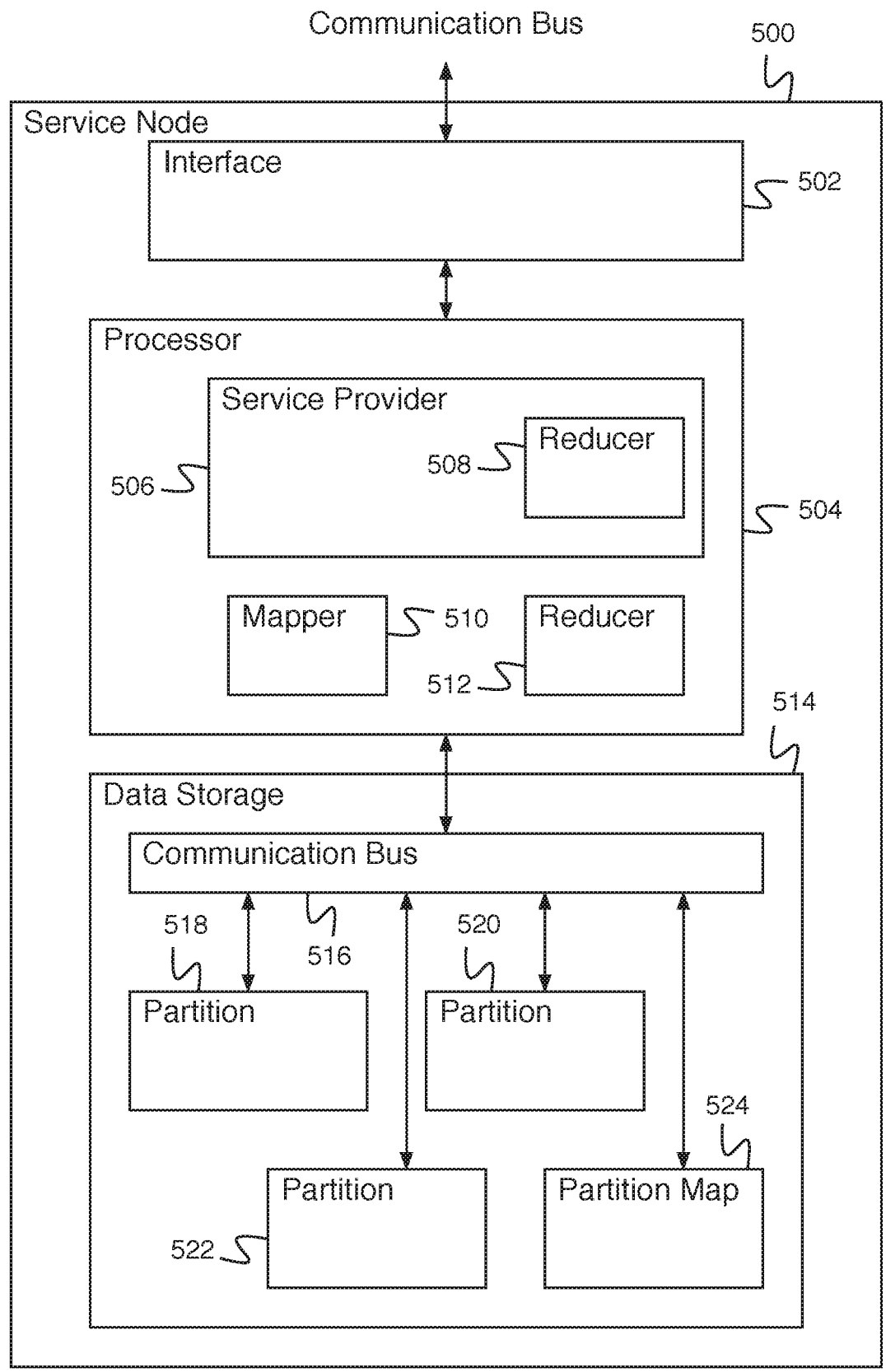
FIG. 5 is a block diagram illustrating an embodiment of a service node.

FIG. 5 is a block diagram illustrating an embodiment of a service node. In some embodiments, service node 500 comprises a node of node pool 204 of FIG. 2 (e.g., service node 214). In the example shown, service node 500 is selected as a service node by a client application system to perform a task and receives task via interface 502. Mapper 510 of processor 504 causes execution of a map partition process for each data stored in the partitions (e.g., partition 518, partition 520, partition 522, as well as partitions on other nodes). Reducer 512 of processor 504 causes execution of a reduce partition process to create a result. Reducer 508 of service provider 506 causes execution of a reduce of results from the partition processes of the partitions or nodes. The result of service provider 506 reduce is provided via interface 502 to the client application system, which in turn provides the result to the requestor of the task.

In the example shown, service node 500 comprises interface 502 for interacting with other systems (e.g., with a client application system). Interface 502 is in communication with processor 504. Processor 504 comprises a processor for processing data. Processor 504 comprises service provider 506 for coordinating a task. Service provider 506 comprises reducer 508 for performing a service node reduce. A service node reduce combines partition results and/or node results to determine a service node result. The service node result is provided by processor 504 via interface 502 to a client application system. Processor 504 additionally comprises mapper 510 for executing a map operation. For example, mapper 510 comprises a mapper for executing a partition map operation on each data element stored by a partition (e.g., a partition stored by data storage 514) to create a set of partition map values for the partition. Processor 504 additionally comprises reducer 512 for executing a reduce operation. For example, reducer 512 executes a partition reduce step to combine partition map values to create a partition result for a partition. In some embodiments, reducer 512 executes a node reduce step to combine partition results to create a node result for a node. Partition results and/or node results are provided to service provider 506. Processor 504 is in communication with data storage 514. Data storage 514 comprises communication bus 516 for allowing partition 518, partition 520, partition 522, or partition map 524 to communicate with processor 504. Partition 518, partition 520, and partition 522 comprise partitions for storing partition data. In some embodiments, partition 518, partition 520, and partition 522 comprise part of a data fabric. Partition map 524 comprises a partition map for storing partition metadata. Partition metadata comprises primary partition identifiers, backup partition identifiers, indications of partition lock status (e.g., read locked, write locked), etc. Partition map 524 acts as a gatekeeper for interactions with data stored on the partitions of a node and, in particular, mediates different requests for accessing the data including reading access, writing access, editing access, or deleting access and whether those requests are allowed or not allowed based on what access is currently occurring for the data.

Figure 6:
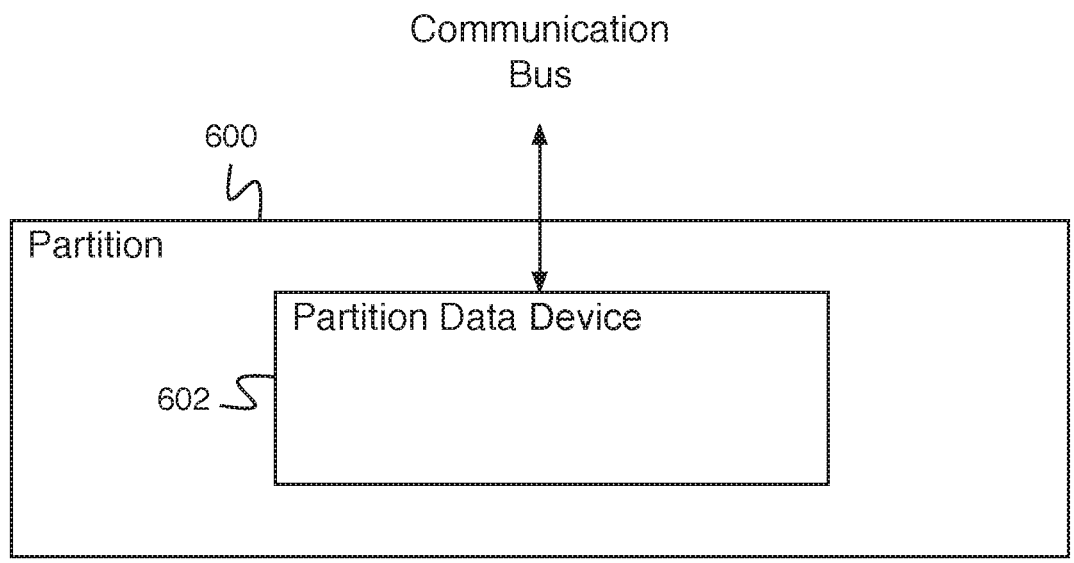
FIG. 6 is a block diagram illustrating an embodiment of a partition.

FIG. 6 is a block diagram illustrating an embodiment of a partition. In some embodiments, partition 600 comprises a partition of FIG. 4 or a partition of FIG. 5. In the example shown, partition 600 stores data in partition data device 602. Data is processed using partition processing instructions (e.g., a map instruction or a reduce instruction) and the results are provided using the communications bus. Partition data device 602 comprises a segment of stored cluster data (e.g., data stored on a cluster system—for example, cluster system 104 of FIG. 1). In various embodiments, partition data comprises raw data, table rows, key-value pairs, or any other appropriate data type. In some embodiments, partition data comprises a set of related data instances—for example, data describing a set of bank accounts, data describing a set of user preferences, data describing a set of transactions, data describing a set of user actions, etc.

Figure 7:
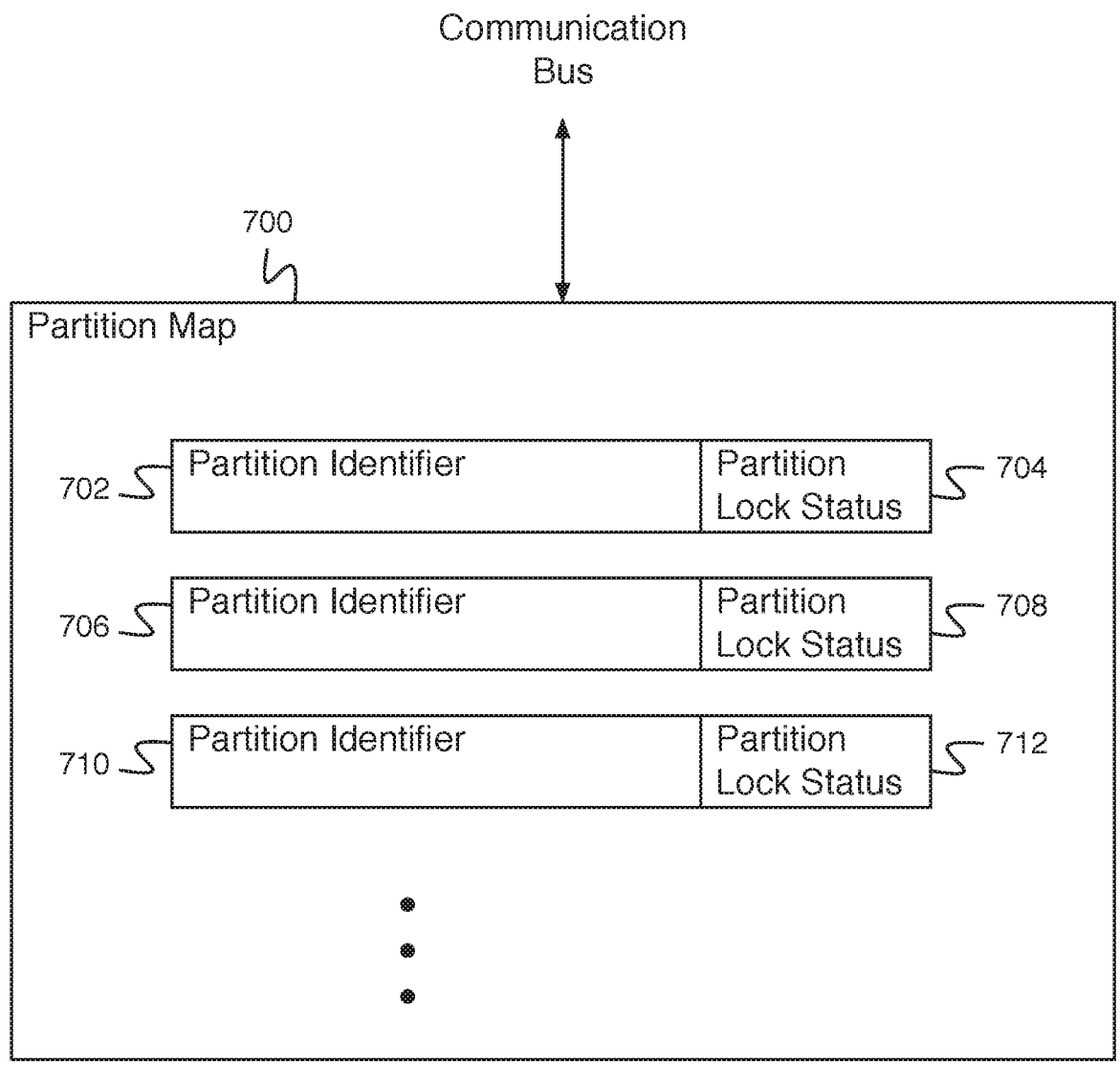
FIG. 7 is a block diagram illustrating an embodiment of a partition map.

FIG. 7 is a block diagram illustrating an embodiment of a partition map. In some embodiments, partition map 700 comprises partition map 420 of FIG. 4 or partition map 524 of FIG. 5. In the example shown, a node receives partition process instructions and causes execution of the instructions to process data in a partition. The partition is processed after locking the data appropriately (e.g., read lock, write lock, etc.) and then after processing unlocking the partition. Partition map 700 comprises a set of partition identifiers and associated partition lock statuses (e.g., partition identifier 702 and associated partition lock status 704, partition identifier 706 and associated partition lock status 708, and partition identifier 710 and associated partition lock status 712). Each partition identifier stored by partition map 700 is associated with a partition stored by the same node as partition map 700. Partition map 700 is used to identify the partitions that are stored by the node. Partition map 700 is additionally used to store a lock status associated with each partition of the node as well as any additional computed values about the contents of the partition data. The lock status comprises a status indicating whether the partition is locked, for example, read locked or write locked. In some embodiments, a partition is locked during a partition map operation.

Figure 8:
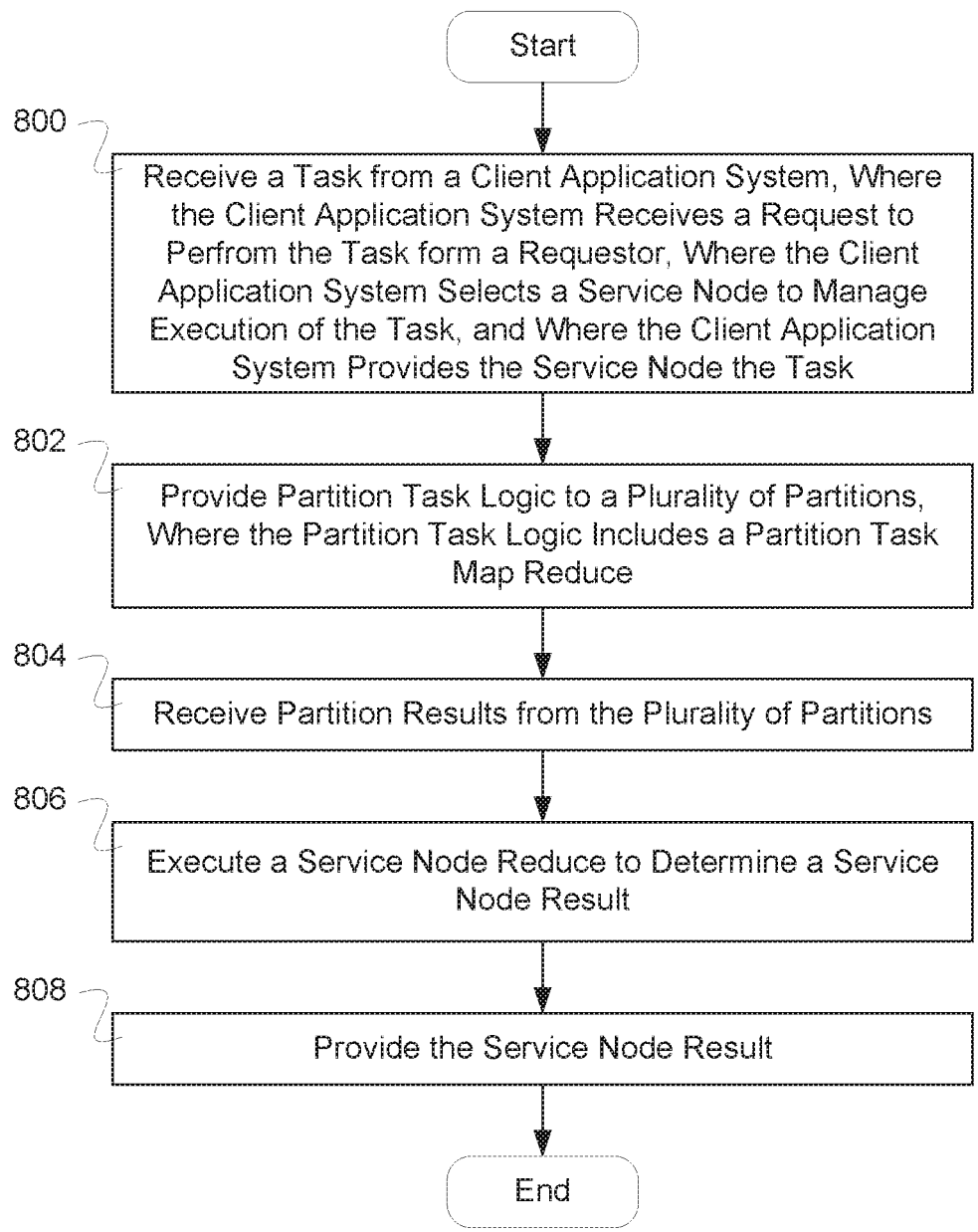
FIG. 8 is a flow diagram illustrating an embodiment of a process for a distributed partitioned map reduce using a data fabric.

FIG. 8 is a flow diagram illustrating an embodiment of a process for a distributed partitioned map reduce using a data fabric. In some embodiments, the process of FIG. 8 is executed by a service node of FIG. 2 (e.g., service node 214). In the example shown, in 800, a task is received from a client application system, wherein the client application system receives a request to perform the task from a requestor, wherein the client application system selects a service node to manage execution of the task, and wherein the client application system provides the service node the task. In 802, partition task logic is provided to a plurality of partitions, wherein the partition task logic includes a partition task map reduce. For example, the partition logic is distributed to the partitions and the partition logic includes a map step and a reduce step that is to be executed on data stored or associated with the partition. In some embodiments, the plurality of partitions comprises partitions stored on nodes other than the service node (e.g., partition nodes). In some embodiments, the plurality of partitions comprises partitions stored on the service node. In 804, partition results are received from the plurality of partitions. In 806, a service node reduce is executed to determine a service node result. In 808, the service node result is provided (e.g., to the client application system).

Figure 9:
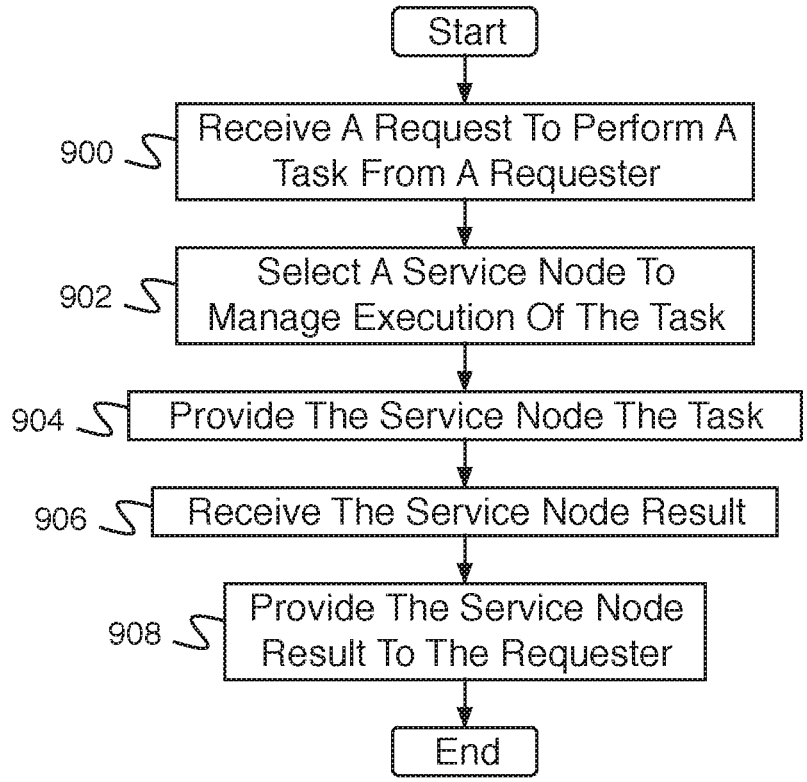
FIG. 9 is a flow diagram illustrating an embodiment of a process for a client application system.

FIG. 9 is a flow diagram illustrating an embodiment of a process for a service node selector. In some embodiments, the process of FIG. 9 is executed by a service node selector of FIG. 3 (e.g., service node selector 306). In the example shown, in 900, a request to perform a task is received from a requester. For example, a request is received from an application. In 902, a service node is selected to manage execution of the task. In 904, the service node is provided the task. In 906, the service node result is received. In 908, the service node result is provided to the requester. For example, a result is provided to the requesting application (e.g., a client application system).

Figure 10:
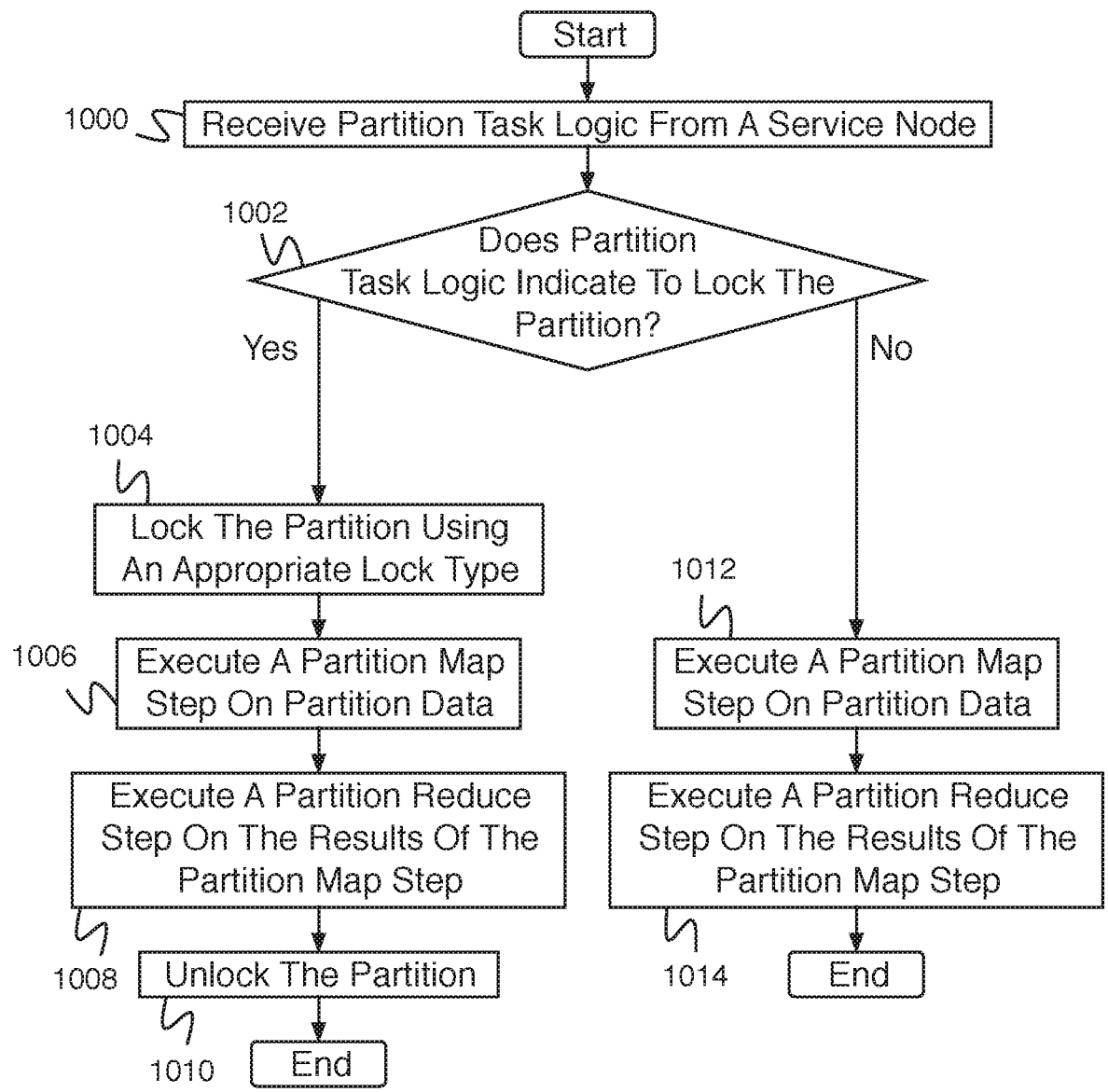
FIG. 10 is a flow diagram illustrating an embodiment of a process for executing partition task logic.

FIG. 10 is a flow diagram illustrating an embodiment of a process for executing partition task logic. In some embodiments, the process of FIG. 10 is executed by a partition node of FIG. 2 (e.g., partition node 208, partition node 210, or partition node 212). In 1000, partition task logic is received from a service node. For example, a partition node receives partition task logic from a service node. In 1002, it is determined whether the partition task logic indicates to lock the partition. In the event it is determined that the partition task logic indicates to lock the partition, control passes to 1004. In 1004, the partition is locked using an appropriate lock type—for example, a read lock or a write lock. Locking the partition is indicated to a partition map (e.g., partition map 700 of FIG. 7). In 1006, a partition map step is executed on partition data. For example, a partition node processor or service node processor execute a map step on partition data using a mapper (e.g., mapper 406 of FIG. 4 or mapper 510 of FIG. 5, respectively). In 1008, a partition reduce step is executed on the results of the partition map step. For example, a partition or a service node processor executes a reduce step on partition data using a reducer (e.g., reducer 408 of FIG. 4 or reducer 512 of FIG. 5, respectively). In 1010, the partition is unlocked, and the process ends. In the event that the partition task logic does not indicate to lock the partition, control passes to 1012. In 1012, a partition map step is executed on partition data. In 1014, a partition reduce step is executed on the results of the partition map step.

Figure 11:
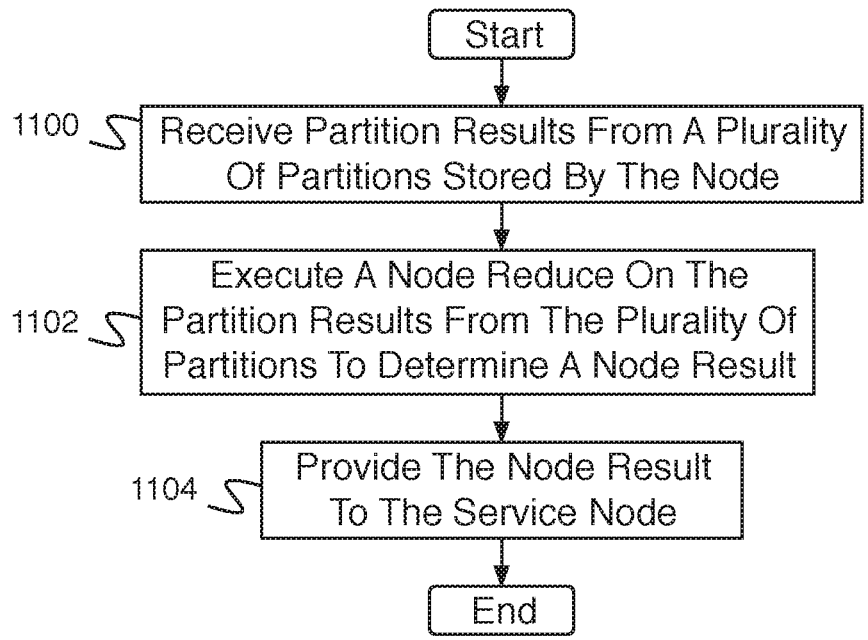
FIG. 11 is a flow diagram illustrating an embodiment of a process for a node reduce.

FIG. 11 is a flow diagram illustrating an embodiment of a process for a node reduce. In some embodiments, the process of FIG. 8 is executed by a node of FIG. 2 (e.g., partition node 212) for combining partition reduce results to create a node result. In the example shown, in 1100, partition results are received from a plurality of partitions stored by the node. In 1102, a node reduce is executed on the partition results from the plurality of partitions to determine a node result. In 1104, the node result is provided to the service node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a distributed partitioned map reduce, comprising:
a plurality of nodes; and
a processor configured to:
select a service node from the plurality of nodes to manage execution of a task based at least in part on a request to perform the task provided by a requestor, wherein the service node is selected based at least in part on a least loaded node of the plurality of nodes or a least recently selected node of the plurality of nodes, wherein each node of the plurality of nodes comprises: 1) data stored in a plurality of partitions and 2) partition metadata stored in a partition map, wherein the partition metadata identifies each partition of the plurality of partitions as a primary partition or a backup partition; and
provide the task to the service node, wherein the service node is configured to:
receive the task;
provide partition task logic of the task to the plurality of partition nodes, wherein the partition task logic is provided to a first partition node of the plurality of partition nodes, wherein the first partition node includes a first partition map and a first plurality of partitions, and wherein, for each partition of the first plurality of partitions, the first partition node:
determines, using the first partition map, whether a partition of the first plurality of partitions is a primary partition or a backup partition, wherein the partition is a first partition, and wherein the first partition node further: a) determines, using the first partition map, whether a second partition of the first plurality of partitions is a primary partition or a backup partition; and b) in response to a determination that the second partition is a backup partition, does not execute the partition map operation on the second partition; and
in response to a determination that the partition is a primary partition, executes the partition map operation on the partition to obtain a partition result;
receive node results from the plurality of nodes, wherein the node results include a first node result from the first partition node, wherein the first node result is determined by the first partition node using the partition result, and wherein the first node result is determined by executing a node reduce step on partition results for partitions of the first plurality of partitions;
aggregate the node results into a service node result; and
provide the service node result.

2. The system of claim 1, wherein a backup partition is a copy of a primary partition.

3. The system of claim 1, wherein a first service node for a first task and a second service node for a second task comprise different nodes.

4. The system of claim 1, wherein the service node result is provided to the requestor.

5. The system of claim 1, wherein the requestor is associated with a client application system.

6. The system of claim 5, wherein the client application system comprises an object transaction server or an object read server.

7. The system of claim 1, wherein the plurality of partitions is part of a data fabric.

8. The system of claim 1, wherein a partition of the plurality of partitions is locked when executing the partition task logic.

9. The system of claim 8, wherein locked comprises read locked.

10. The system of claim 8, wherein locked comprises write locked.

11. The system of claim 1, wherein the partition task logic additionally comprises a partition task map.

12. A method for a distributed partitioned map reduce, comprising:
  selecting a service node from a plurality of nodes to manage execution of a task based at least in part on a request to perform the task provided by a requestor, wherein the service node is selected based at least in part on a least loaded node of the plurality of nodes or a least recently selected node of the plurality of nodes, wherein each node of the plurality of nodes comprises: 1) data stored in a plurality of partitions and 2) partition metadata stored in a partition map, wherein the partition metadata identifies each partition of the plurality of partitions as a primary partition or a backup partition; and
  providing the task to the service node, wherein the service node is configured for:
    receiving the task;
    providing partition task logic of the task to the plurality of partition nodes, wherein the partition task logic is provided to a first partition node of the plurality of partition nodes, wherein the first partition node includes a first partition map and a first plurality of partitions, and wherein, for each partition of the first plurality of partitions, the first partition node:
      determines, using the first partition map, whether a partition of the first plurality of partitions is a primary partition or a backup partition, wherein the partition is a first partition, and wherein the first partition node further: a) determines, using the first partition map, whether a second partition of the first plurality of partitions is a primary partition or a backup partition; and b) in response to a determination that the second partition is a backup partition, does not execute the partition map operation on the second partition; and
      in response to a determination that the partition is a primary partition, executes the partition map operation on the partition to obtain a partition result;
    receiving node results from the plurality of nodes, wherein the node results include a first node result from the first partition node, wherein the first node result is determined by the first partition node using the partition result, and wherein the first node result is determined by executing a node reduce step on partition results for partitions of the first plurality of partitions;
    aggregating the node results into a service node result; and
    providing the service node result.

13. A computer program product for a distributed partitioned map reduce, the computer program product being embodied in a non-transitory computer readable storage medium and comprising computer instructions for:
  selecting a service node from a plurality of nodes to manage execution of a task based at least in part on a request to perform the task provided by a requestor, wherein the service node is selected based at least in part on a least loaded node of the plurality of nodes or a least recently selected node of the plurality of nodes, wherein each node of the plurality of nodes comprises: 1) data stored in a plurality of partitions and 2) partition metadata stored in a partition map, wherein the partition metadata identifies each partition of the plurality of partitions as a primary partition or a backup partition; and
  providing the task to the service node, wherein the service node is configured for:
    receiving the task;
    providing partition task logic of the task to the plurality of partition nodes, wherein the partition task logic is provided to a first partition node of the plurality of partition nodes, wherein the first partition node includes a first partition map and a first plurality of partitions, and wherein, for each partition of the first plurality of partitions, the first partition node:
      determines, using the first partition map, whether a partition of the first plurality of partitions is a primary partition or a backup partition, wherein the partition is a first partition, and wherein the first partition node further: a) determines, using the first partition map, whether a second partition of the first plurality of partitions is a primary partition or a backup partition; and b) in response to a determination that the second partition is a backup partition, does not execute the partition map operation on the second partition; and
      in response to a determination that the partition is a primary partition, executes the partition map operation on the partition to obtain a partition result;
    receiving node results from the plurality of nodes, wherein the node results include a first node result from the first partition node, wherein the first node result is determined by the first partition node using the partition result, and wherein the first node result is determined by executing a node reduce step on partition results for partitions of the first plurality of partitions;
    aggregating the node results into a service node result; and
    providing the service node result.

14. The system of claim 1, wherein access to data stored on the plurality of partitions is controlled using the partition map.

15. The system of claim 1, wherein the partition map comprises a set of indications of partition lock status.

16. The system of claim 1, wherein the partition map comprises a set of partition identifiers.

17. The system of claim 1, wherein the first node result comprises the partition result.

* * * * *